United States Patent
Binek et al.

(10) Patent No.: US 12,253,093 B2
(45) Date of Patent: Mar. 18, 2025

(54) SUPPORT STRUCTURE FOR FORMING TURBINE ENGINE ROTATING STRUCTURE

(71) Applicant: Raytheon Technologies Corporation, Farmington, CT (US)

(72) Inventors: Lawrence A. Binek, Glastonbury, CT (US); Jose R. Paulino, Jupiter, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/209,272

(22) Filed: Jun. 13, 2023

(65) Prior Publication Data

US 2024/0418177 A1   Dec. 19, 2024

(51) Int. Cl.
| | | |
|---|---|---|
| *F04D 29/053* | (2006.01) | |
| *B22F 5/00* | (2006.01) | |
| *B22F 10/20* | (2021.01) | |
| *B22F 10/47* | (2021.01) | |
| *B23P 15/00* | (2006.01) | |

(Continued)

(52) U.S. Cl.
CPC ............ *F04D 29/053* (2013.01); *B22F 5/009* (2013.01); *B22F 10/20* (2021.01); *B22F 10/47* (2021.01); *B23P 15/006* (2013.01); *B33Y 10/00* (2014.12); *F04D 29/20* (2013.01); *F05D 2230/31* (2013.01)

(58) Field of Classification Search
CPC .......... B22F 10/40; B22F 10/47; B22F 10/20; B22F 10/28; B22F 5/009; B29C 64/40; B23P 15/006; F01D 5/02; F01D 5/043; F01D 5/048; Y10T 29/49325; Y10T 29/49329; Y10T 29/4981; F05D 2230/22; F05D 2230/30; F05D 2230/53; B33Y 10/00; B33Y 80/00
See application file for complete search history.

(56) References Cited

U.S. PATENT DOCUMENTS

| | | | | |
|---|---|---|---|---|
| 7,281,901 | B2 * | 10/2007 | Garman | ........ B22F 5/10 416/213 R |
| 11,167,351 | B2 | 11/2021 | Paniogue | |
| 11,179,895 | B2 | 11/2021 | Binek | |

(Continued)

FOREIGN PATENT DOCUMENTS

| | | |
|---|---|---|
| CN | 113814417 B | 9/2023 |
| JP | 2019138444 A | 8/2019 |
| WO | WO-2018046182 A1 * | 3/2018 |

OTHER PUBLICATIONS

WO2018046182 (Year: 2018).*
EP Search Report for EP Patent Application No. 24181698.2 dated Nov. 25, 2024.

*Primary Examiner* — Matthew P Travers
(74) *Attorney, Agent, or Firm* — Getz Balich LLC

(57) ABSTRACT

A method of manufacturing is provided. During this method, a body is formed using an additive manufacturing process. The body includes a shaft, a bladed rotor and a support structure. The shaft projects axially along an axis out from the bladed rotor. The support structure projects radially out from the shaft and axially to the bladed rotor. The support structure includes a plurality of channels arranged circumferentially about the axis. Each of the channels projects radially into the support structure towards the axis and to a respective channel side. Each of the channels projects axially into the support structure towards the bladed rotor and to a respective channel end.

16 Claims, 10 Drawing Sheets

(51) Int. Cl.
*B33Y 10/00* (2015.01)
*F04D 29/20* (2006.01)

(56) References Cited

U.S. PATENT DOCUMENTS

| | | |
|---|---|---|
| 2018/0233977 A1 | 8/2018 | Volkmuth |
| 2019/0003322 A1* | 1/2019 | Rettberg ................. F01D 5/043 |
| 2020/0040739 A1* | 2/2020 | Notarnicola ............ F01D 5/048 |
| 2021/0299812 A1* | 9/2021 | Sakai ...................... B22F 10/47 |
| 2023/0099661 A1 | 3/2023 | Ryon |

* cited by examiner

SUPPORT STRUCTURE FOR FORMING TURBINE ENGINE ROTATING STRUCTURE

BACKGROUND OF THE DISCLOSURE

1. Technical Field

This disclosure relates generally to a turbine engine and, more particularly, to a rotating structure for the turbine engine and methods for forming the rotating structure.

2. Background Information

A gas turbine engine may include one or more rotating structures. Such a rotating structure may include a shaft and one or more bladed rotors. Various types of and methods for forming rotating structures are known in the art. While these known rotating structures and formation methods have various benefits, there is known in the art for improvement.

SUMMARY OF THE DISCLOSURE

According to an aspect of the present disclosure, a method of manufacturing is provided. During this method, a body is formed using an additive manufacturing process. The body includes a shaft, a bladed rotor and a support structure. The shaft projects axially along an axis out from the bladed rotor. The support structure projects radially out from the shaft and axially to the bladed rotor. The support structure includes a plurality of channels arranged circumferentially about the axis. Each of the channels projects radially into the support structure towards the axis and to a respective channel side. Each of the channels projects axially into the support structure towards the bladed rotor and to a respective channel end.

According to another aspect of the present disclosure, another method of manufacturing is provided. During this method, a monolithic body is formed using an additive manufacturing process. The monolithic body includes a shaft, a bladed rotor and a support structure. The shaft projects axially along an axis away from the bladed rotor. The support structure extends between the shaft and the bladed rotor. The support structure includes a plurality of baffles arranged circumferentially about the axis in an array. Each of the baffles projects radially out from the shaft to an outer side of the support structure. Each of the baffles projects axially along the shaft, away from the bladed rotor, to the outer side of the support structure. The baffles are machined away following the forming of the monolithic body.

According to still another aspect of the present disclosure, an apparatus is provided for a turbine engine. This apparatus includes a monolithic body, and the monolithic body includes a shaft, a bladed rotor and a support structure. The shaft projects axially along an axis out from the bladed rotor. The bladed rotor is configured as a radial flow rotor. The support structure projects radially out from the shaft and axially to the bladed rotor. The support structure includes a plurality of channels arranged circumferentially about the axis in an array. Each of the channels projects radially into the support structure towards the axis and to a respective channel side. Each of the channels projects axially into the support structure towards the bladed rotor and to a respective channel end.

The support structure may also include a plurality of channels arranged circumferentially about the axis and interposed with the baffles. Each of the channels may project axially into the support structure towards the bladed rotor and to a respective channel end. The channel end of at least some of the channels may be aligned with a reference plane which is angularly offset from the axis by an acute angle.

The support structure may also include a plurality of channels arranged circumferentially about the axis and interposed with the baffles. Each of the channels may project axially into the support structure towards the bladed rotor and to a respective channel end. The channel end of at least some of the channels may be aligned with a reference plane. The channel end of at least some others of the channels may be axially offset from the reference plane.

The channel end of each of the channels may be aligned with a reference plane which is angularly offset from the axis by an acute angle.

At least eighty percent of a span line of the channel end of each of the channels may lay along the reference plane.

A common point along a span line of the channel end of each of the channels may be disposed in the reference plane.

The acute angle may be equal to or greater than eighty-five degrees.

The channels may be first channels. The support structure may also include a plurality of second channels arranged circumferentially about the axis and interposed with the first channels. Each of the second channels may project axially into the support structure towards the bladed rotor and to a respective channel end. The channel end of each of the first channels and the channel end of each of the second channels may be aligned with a reference plane. An axial span of each of the first channels may be different than an axial span of each of the second channels.

The channels may be first channels. The support structure may also include a plurality of second channels arranged circumferentially about the axis and interposed with the first channels. The channel end of each of the first channels may be aligned with a reference plane. Each of the second channels may project axially into the support structure towards the bladed rotor and to a respective channel end. The channel end of each of the second channels may be axially offset from the reference plane.

The channels may be first channels. The support structure may also include a plurality of second channels arranged circumferentially about the axis and interposed with the first channels. An axial span of each of the first channels may be different than an axial span of each of the second channels. A radial span of each of the first channels may be equal to a radial span of each of the second channels.

The channels may include a first channel. The first channel may have a radial span and a uniform lateral width as the first channel extends radially into the support structure along at least ninety percent of the radial span.

The channels may include a first channel. The first channel may have an axial span and a uniform lateral width as the first channel extends axially into the support structure along at least ninety percent of the axial span.

The channels may include a first channel. The first channel may have a triangular sectional geometry or a trapezoidal sectional geometry when viewed in a second reference plane parallel with the axis.

The support structure may also include a plurality of baffles arranged circumferentially about the axis and interposed with the channels. Each of the baffles may project radially out from the shaft and axially towards the bladed rotor.

The baffles may include a first baffle which laterally tapers as the first baffle extends radially towards the shaft.

The channels may be first channels. The baffles may include a first baffle. A second channel may project radially into the first baffle towards the axis and axially into the first baffle towards the bladed rotor.

The bladed rotor may be configured as or otherwise include a radial flow rotor.

The method may also include machining away at least some of the support structure to remove the plurality of channels.

The method may also include machining the shaft to form an engine shaft.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
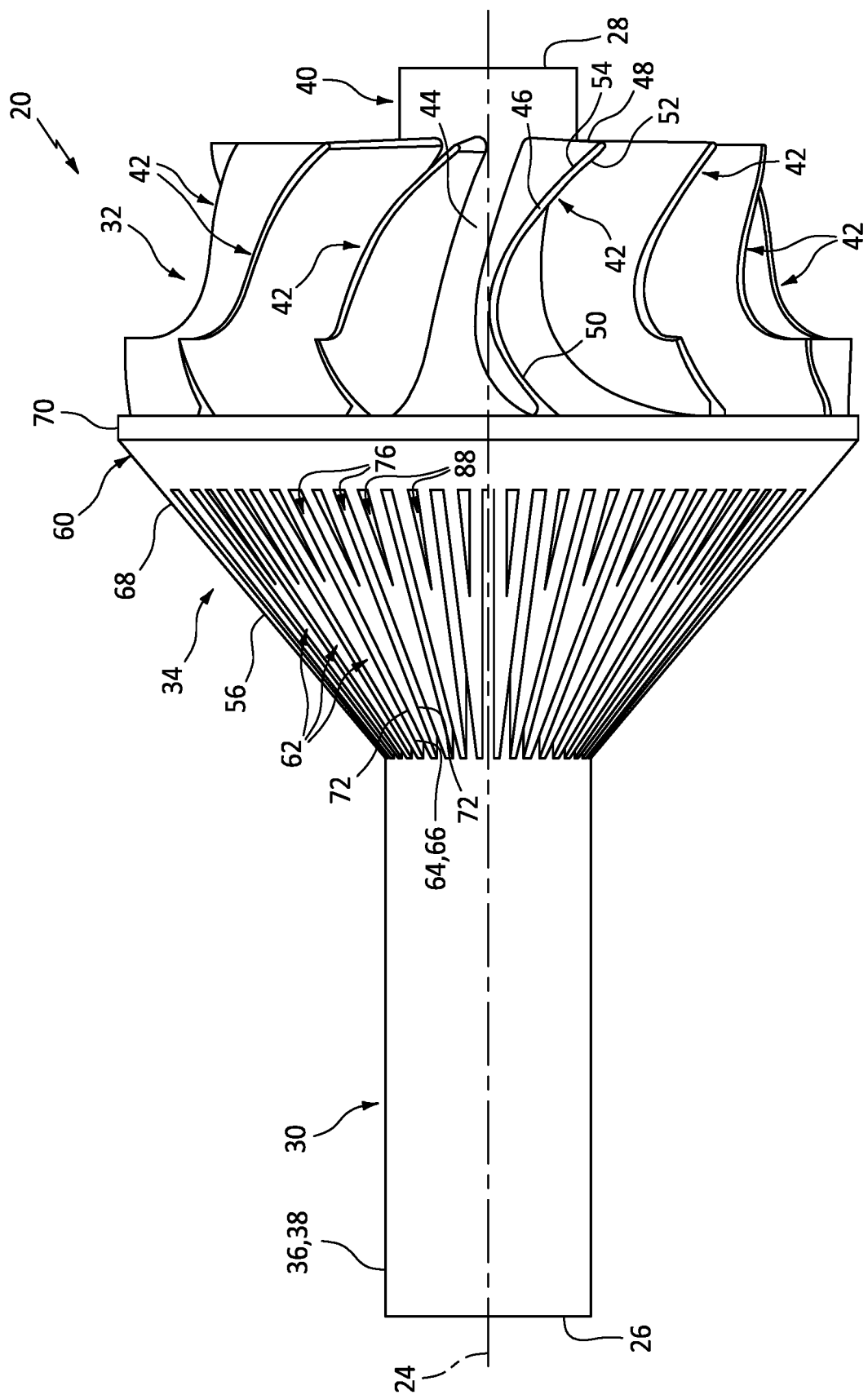
FIG. 1 is a perspective illustration of a turbine engine apparatus.

FIG. 1 illustrates an apparatus 20 for a turbine engine. This turbine engine may be configured as, or may otherwise be included as part of, a propulsion system for an aircraft. The turbine engine, for example, may be a turbojet engine, a turbofan engine, a turboprop engine, a pusher fan engine or a propfan engine. The turbine engine may also or alternatively be configured as, or may otherwise be included as part of, an electric power generator for the aircraft. The turbine engine, for example, may be an auxiliary power unit (APU) engine. The aircraft may be an airplane, a helicopter, a drone (e.g., an unmanned aerial vehicle (UAV)) or any other manned or unmanned aerial vehicle or system. The present disclosure, however, is not limited to the foregoing exemplary turbine engine types nor to aircraft applications in general.

Figure 2:
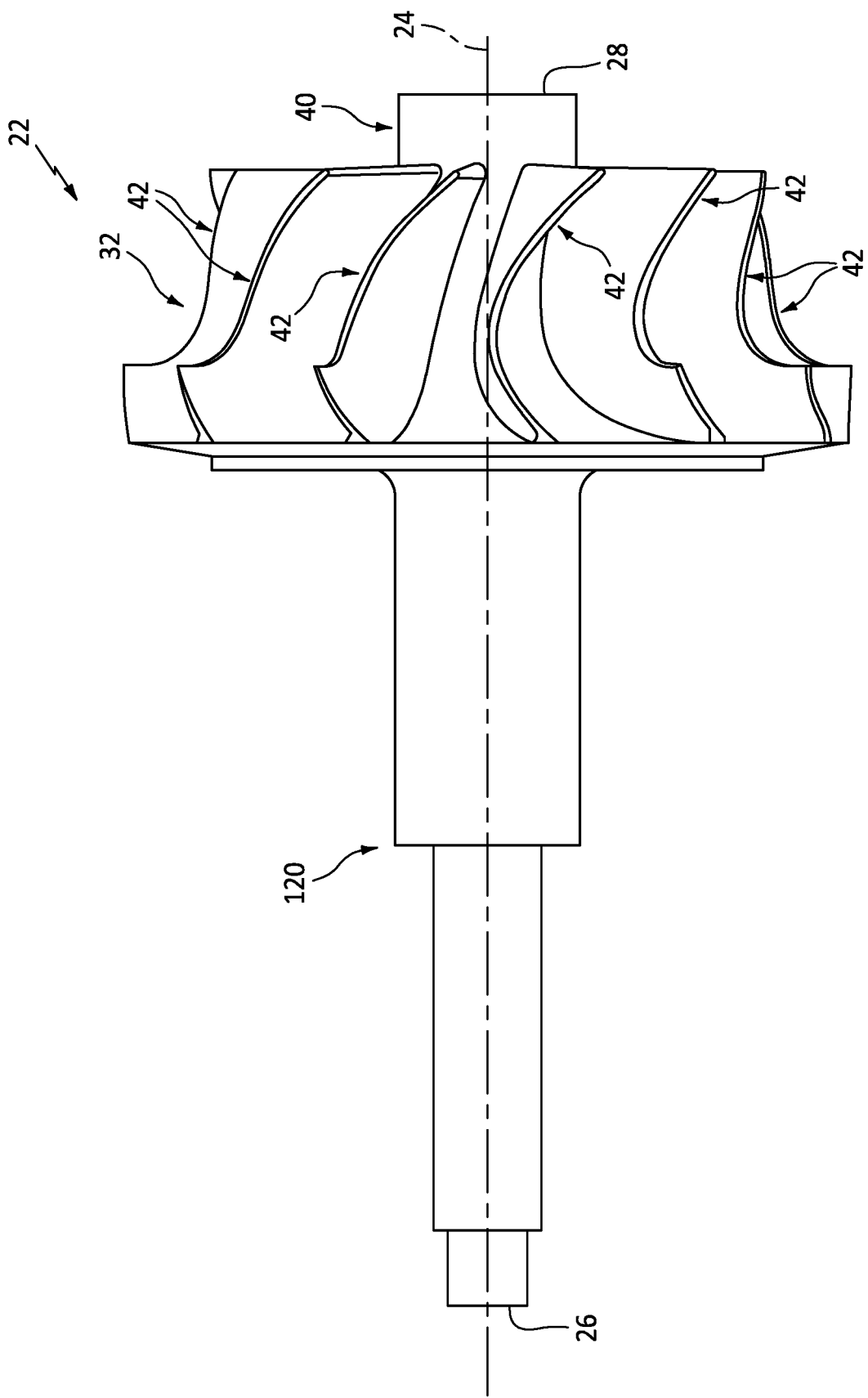
FIG. 2 is a perspective illustration of a rotating structure which may be formed from the turbine engine apparatus.

The engine apparatus 20 may be configured as a preform used during manufacture of a component or components of the turbine engine. The engine apparatus 20 of FIG. 1, for example, is configured as a preform of a rotating structure 22 of the turbine engine, an example of which is shown in FIG. 2. This preform rotating structure—the engine apparatus 20—may have a similar general configuration to the rotating structure 22 being manufactured. However, one or more portions of the preform rotating structure—the engine apparatus 20—may be machined away and/or otherwise finished to define the final rotating structure 22 of FIG. 2. Of course, it is contemplated the engine apparatus 20 of FIG. 1 may alternatively be utilized as the final form structure for the turbine engine in other embodiments as discussed below in further detail.

The engine apparatus 20 of FIG. 1 extends axially along an axis 24 between and to an axial first end 26 of the engine apparatus 20 and an axial second end 28 of the engine apparatus 20. This engine apparatus 20 includes an apparatus shaft 30, an apparatus bladed rotor 32 and an apparatus support structure 34 connected to (e.g., formed integral with) and between the apparatus shaft 30 and the bladed rotor 32. Briefly, the axis 24 may be a centerline axis of the engine apparatus 20 and/or one or more of its members 30, 32 and/or 34. This axis 24 may also be a rotational axis of the rotating structure 22 of FIG. 2.

Figure 3:
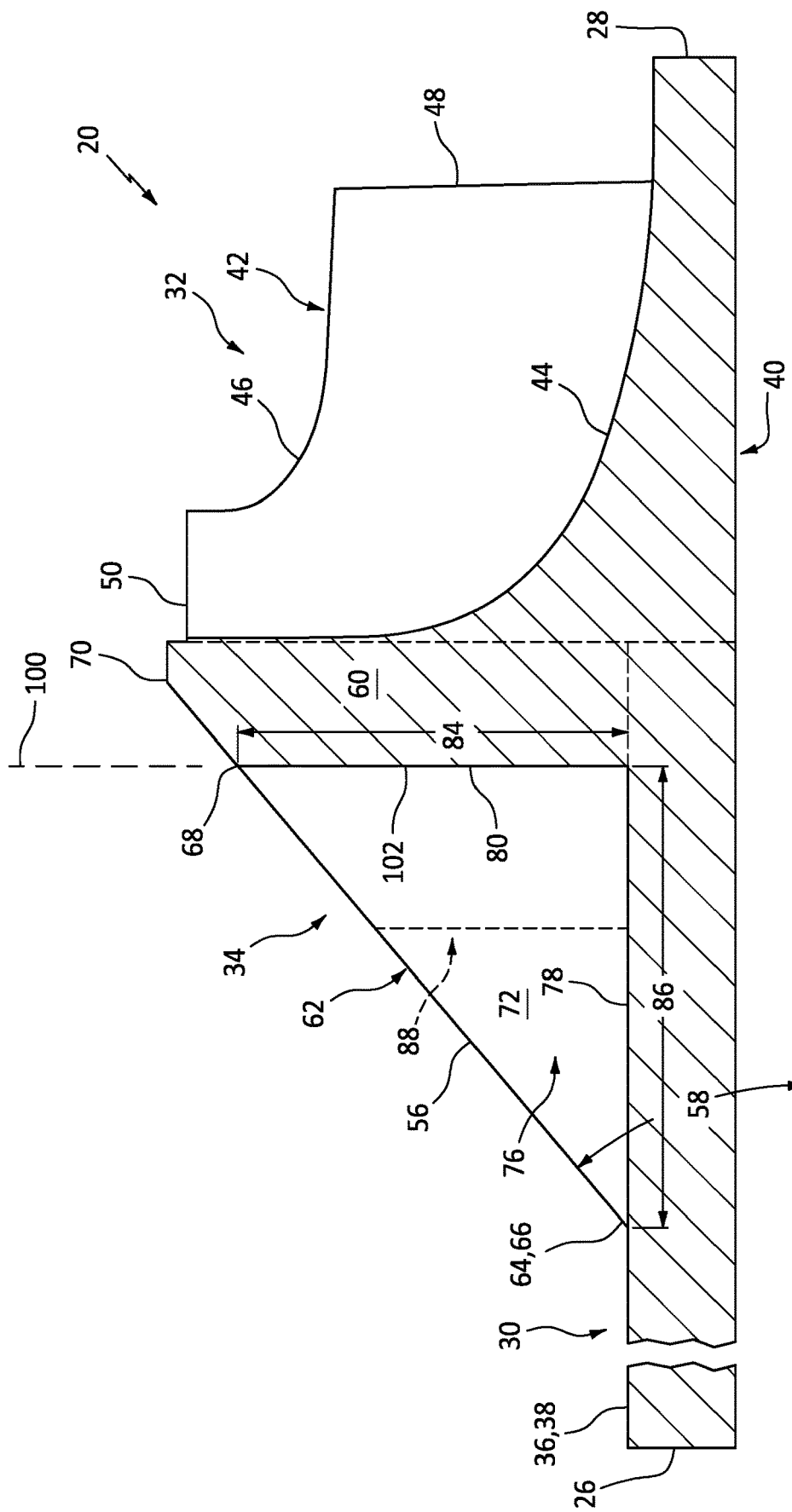
FIG. 3 is a partial side sectional illustration of the turbine engine apparatus at an inter-baffle channel.

Referring to FIG. 3, the apparatus shaft 30 projects axially along the axis 24 out from the bladed rotor 32 to the apparatus first end 26; here, an axial distal end of the apparatus shaft 30. The apparatus shaft 30 projects radially (in a radial outward direction away from the axis 24) to a radial outer side 36 of the apparatus shaft 30. The apparatus shaft 30 of FIG. 1 includes a cylindrical outer surface 38 disposed at the shaft outer side 36. This shaft outer surface 38 of FIG. 1 extends axially along the axis 24 from the support structure 34 to the apparatus first end 26.

The bladed rotor 32 may be configured as a radial flow rotor (or a preform radial flow rotor) for the turbine engine. The bladed rotor 32 of FIG. 1, for example, is configured as a radial flow turbine rotor (e.g., a radial inflow-axial outflow turbine rotor) for use in a turbine section of the turbine engine. It is contemplated, however, the bladed rotor 32 may alternatively be configured as a radial flow compressor rotor (e.g., an axial inflow-radial outflow compressor rotor) for use in a compressor section of the turbine engine. Moreover, it is contemplated the bladed rotor 32 may still alternatively be configured as an axial flow rotor for use in the turbine section (or the compressor section) of the turbine engine in other embodiments. However, for ease of description, the bladed rotor 32 is described below as the radial flow turbine rotor. The bladed rotor 32 of FIG. 1 includes a rotor hub 40 and a plurality of radial flow rotor blades 42; e.g., radial inflow-axial outflow turbine blades.

Referring to FIG. 3, the rotor hub 40 projects axially along the axis 24 from the support structure 34 to the apparatus second end 28. The rotor hub 40 projects radially (in the radial outward direction) to a radial outer side of the bladed rotor 32 and its rotor hub 40. The rotor hub 40 forms a platform with a flowpath surface 44 (see also FIG. 1). This flowpath surface 44 may have a curved (e.g., arcuate, quarter circular, splined, etc.) sectional geometry when viewed, for example, in an axial reference plane parallel with (e.g., including) the axis 24. With this arrangement, the rotor hub 40 projects radially (in the radial outward direction) and axially (in a direction away from the support structure 34/a direction towards the apparatus second end 28) to the flowpath surface 44.

Referring to FIG. 1, the rotor blades 42 are arranged circumferentially about the axis 24 and the rotor hub 40 in an annular array; e.g., a circular array. Each of the rotor blades 42 is connected (e.g., formed integral with) the rotor hub 40. Each rotor blade 42 of FIG. 3 projects axially out from the rotor hub 40 and its flowpath surface 44 along the axis 24 (in the direction away from the support structure 34/the direction towards the apparatus second end 28) to a tip 46 of the respective rotor blade 42 and an axial end 48 of the respective rotor blade 42. Each rotor blade 42 projects radially out from the rotor hub 40 and its flowpath surface 44 (in the radial outward direction) to its blade tip 46 and a radial end 50 of the respective rotor blade 42. The blade tip 46 projects radially inwards towards the axis 24 from the blade radial end 50, and the blade tip 46 projects axially along the axis 24 to the blade axial end 48. Here, the blade axial end 48 forms a trailing edge of the respective rotor blade 42, and the blade radial end 50 forms a leading edge of the respective rotor blade 42. However, where the rotor blades 42 are compressor blades, the blade axial end 48 forms the leading edge of the respective rotor blade 42, and the blade radial end 50 forms the trailing edge of the respective rotor blade 42. Referring to FIG. 1, each rotor blade 42 has a pressure side 52 (e.g., a concave side) and a suction side 54 (e.g., a convex side).

The support structure 34 of FIG. 1 projects axially out from the bladed rotor 32 and its rotor hub 40, and axially along the axis 24 and the apparatus shaft 30, to an outer side 56 of the support structure 34. The support structure 34 projects radially out from the apparatus shaft 30, and radially along the bladed rotor 32 and its rotor hub 40, to the structure outer side 56. The support structure 34 and its structure outer side 56 extends circumferentially about (e.g., completely around) the axis 24 and the apparatus shaft 30. Referring to FIG. 3, the structure outer side 56 may have a straight-line sectional geometry when viewed, for example, in the axial reference plane. The structure outer side 56 is angularly offset from the axis 24 (and the shaft outer surface 38) by an include angle 58. This included angle 58 is a non-zero acute angle and may be between thirty degrees (30°) and sixty degrees (60°); e.g., forty-five degrees (45°). With the foregoing arrangement, referring to FIG. 1, the structure outer side 56 may have a frustoconical geometry. The present disclosure, however, is not limited to such an exemplary arrangement. For example, in other embodiments, at least a portion of the structure outer side 56 may alternatively have a curved (e.g., concave, convex) or otherwise non-straight sectional geometry when viewed, for example, in the axial reference plane.

The support structure 34 of FIG. 1 includes an annular structure base 60 and a plurality of structure baffles 62 arranged circumferentially about the axis 24 and the apparatus shaft 30 in an annular array; e.g., a circular array. Referring to FIG. 3, the structure base 60 is disposed axially adjacent and is connected to the bladed rotor 32 and its rotor hub 40. The structure base 60 of FIG. 3, for example, extends axially along the axis 24 and the apparatus shaft 30 between the rotor hub 40 and the array of the structure baffles 62. This structure base 60 projects radially (in the radial outward direction) from the apparatus shaft 30 to the structure outer side 56.

Each structure baffle 62 projects axially out from the structure base 60, and axially along the axis 24 and the apparatus shaft 30, to the structure outer side 56. Each structure baffle 62 projects radially out from the apparatus shaft 30, and radially along the structure base 60, to the structure outer side 56. With this arrangement, each structure baffle 62 of FIG. 3 may have a polygonal (e.g., triangular) sectional geometry when viewed, for example, in the axial reference plane. Moreover, each structure baffle 62 radially tapers as the respective structure baffle 62 projects axially out (or away) from the structure base 60 to (or towards) an axial tip 64 of the respective structure baffle 62. Here, each axial baffle tip 64 is disposed at an axial distal end 66 of the support structure 34. Each structure baffle 62 also axially tapers as the respective structure baffle 62 projects radially out (or away) from the apparatus shaft 30 to (or towards) a radial tip 68 of the respective structure baffle 62. Here, each radial baffle tip 68 is disposed at or about a radial distal end 70 of the support structure 34.

Figure 4:
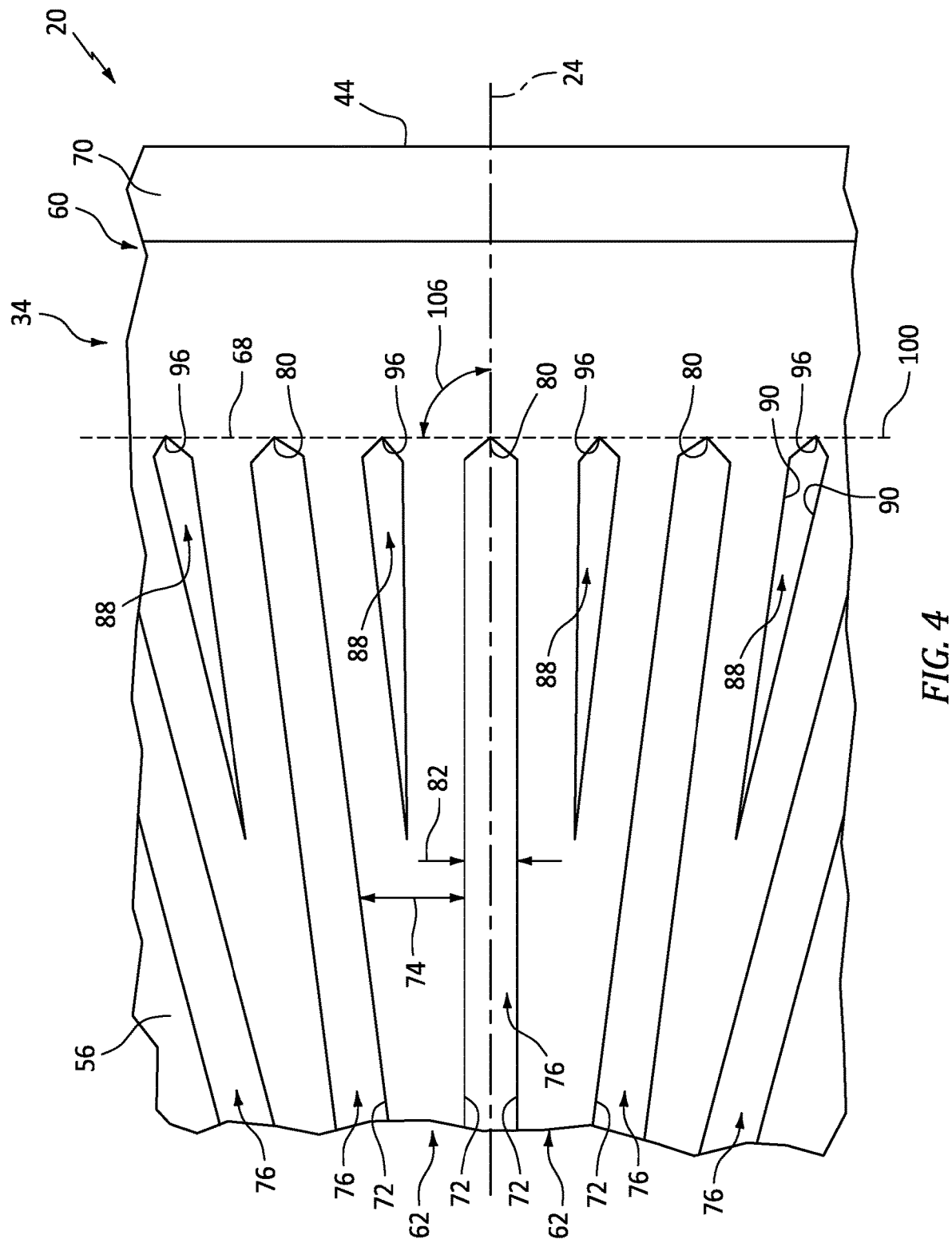
FIG. 4 is a perspective illustration of a section of a support structure of the turbine engine apparatus.
Figure 5:
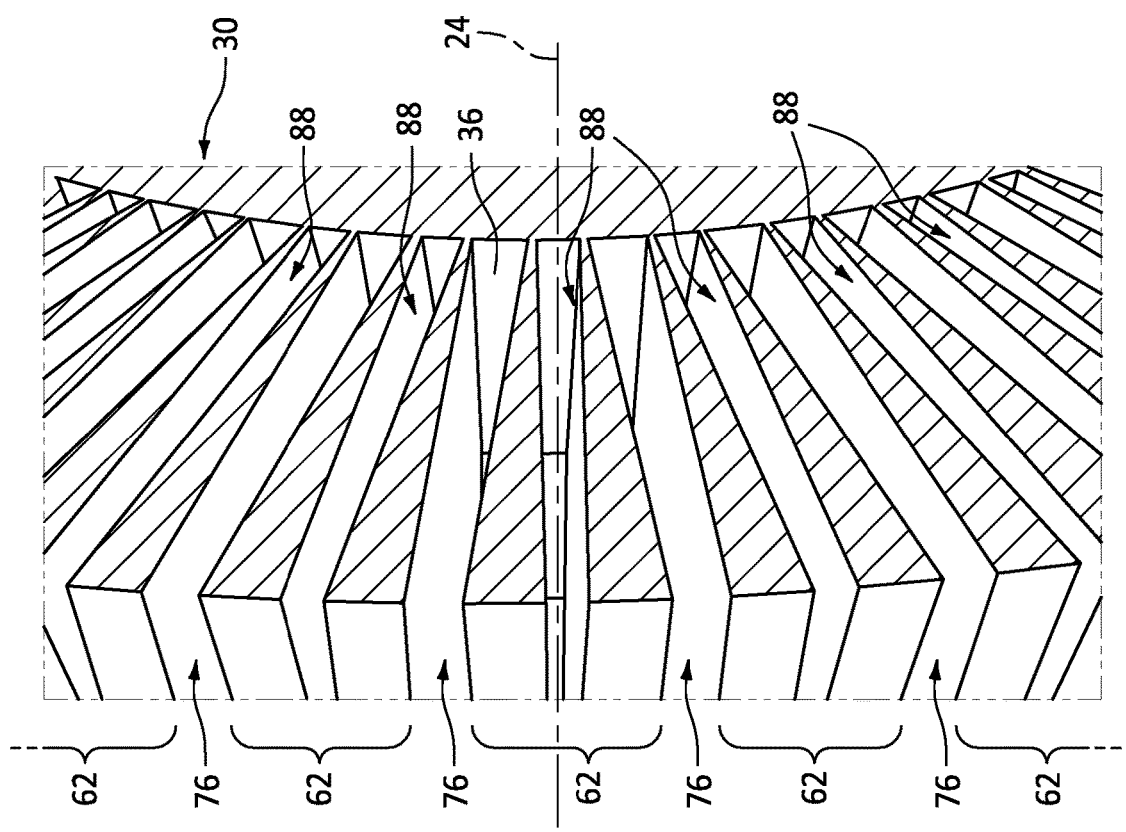
FIG. 5 is a perspective cutaway illustration of a section of the turbine engine apparatus at the support structure.

Referring to FIG. 4, each structure baffle 62 extends laterally (e.g., circumferentially or tangentially) between opposing lateral sides 72 of the respective structure baffle 62. Each structure baffle 62 has a lateral thickness 74 extending laterally between the baffle sides 72. This baffle thickness 74 may change (e.g., decrease) as the respective structure baffle 62 extends radially to (or towards) the apparatus shaft 30. Each structure baffle 62 of FIG. 1, for example, (e.g., continuously) laterally tapers as the respective structure baffle 62 extends radially (in a radial inward direction towards the axis 24) from the structure outer side 56 to the apparatus shaft 30 and its shaft outer side 36. Each structure baffle 62 of FIG. 5, for example, may have a polygonal (e.g., triangular or trapezoidal) sectional geometry when viewed, for example, in a radial reference plane perpendicular to the axis 24. However, referring again to FIG. 4, the baffle thickness 74 may be uniform (e.g., constant) as the respective structure baffle 62 extends axially (at a constant radial distance from the axis 24) between the structure outer side 56 and the structure base 60.

Each structure baffle 62 of FIG. 4 is laterally spaced from each laterally neighboring (e.g., adjacent) structure baffle 62. Each laterally neighboring pair of the structure baffles 62 thereby forms an inter-baffle channel 76 (e.g., slot) in the support structure 34. Thus, each inter-baffle channel 76 is disposed laterally between (and formed by) a respective laterally neighboring pair of the structure baffles 62. Similarly, each structure baffles 62 is disposed laterally between a respective laterally neighboring pair of the inter-baffle channels 76. The inter-baffle channels 76 are arranged circumferentially about the axis 24 and the apparatus shaft 30 (see FIG. 1) in an annular array; e.g., a circular array. The inter-baffle channels 76 are circumferentially interposed with the structure baffles 62.

Referring to FIG. 3, each inter-baffle channel 76 projects radially into the engine apparatus 20/radially through the support structure 34 (in the radial inward direction) from the structure outer side 56 to a radial inner side 78 of the respective inter-baffle channel 76. The channel side 78 of FIG. 3 is disposed at (e.g., formed by) the apparatus shaft 30. Each inter-baffle channel 76 projects axially into the engine apparatus 20 and its support structure 34 from the structure outer side 56 to an axial end 80 of the respective inter-baffle channel 76. The channel end 80 of FIG. 3 is formed by the structure base 60. Referring to FIG. 4, each inter-baffle channel 76 has a lateral width 82 measured between the sides 72 of the respective laterally adjacent structure baffles 62 forming the respective inter-baffle channel 76. This channel width 82 may be uniform as the respective inter-baffle channel 76 extends radially into the support structure 34 along at least ninety percent (90%) or ninety-five percent (95%) of a (e.g., overall, maximum) radial span 84 of the respective inter-baffle channel 76 (see FIG. 3). The channel width 82 may also or alternatively be uniform as the respective inter-baffle channel 76 extends axially into the support structure 34 along at least ninety percent (90%) or ninety-five percent (95%) of an (e.g., overall, maximum) axial span 86 of the respective inter-baffle channel 76 (see FIG. 3). Note, the channel width 82 radially at the channel side 78 and/or axially at the channel end 80 may change (e.g., decrease) such that the respective inter-baffle channel 76 may be tapered (e.g., rounded) at the channel side 78 and/or at the channel end 80.

Referring to FIG. 3, each inter-baffle channel 76 may have a polygonal (e.g., triangular) sectional geometry when viewed, for example, in the axial reference plane. Moreover, each inter-baffle channel 76 radially tapers as the respective inter-baffle channel 76 extends axially within the support structure 34 in a direction from the structure base 60 towards the axial distal end 66 of the support structure 34. Each inter-baffle channel 76 also axially tapers as the respective inter-baffle channel 76 extends radially within the support structure 34 in the radial outward direction.

Figure 6:
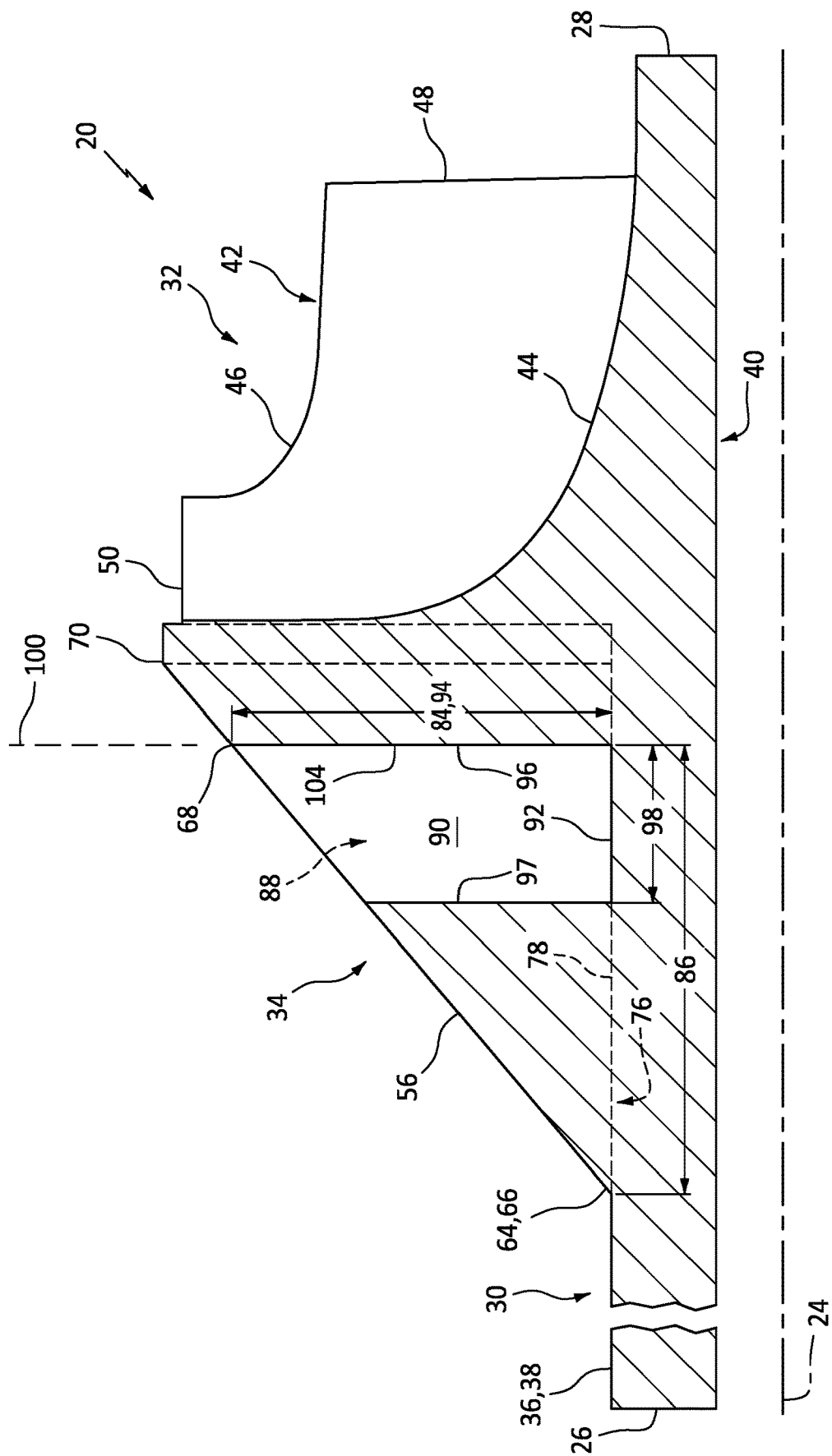
FIG. 6 is a partial side sectional illustration of the turbine engine apparatus at an intra-baffle channel.

Referring to FIG. 4, each structure baffle 62 may include an intra-baffle channel 88. This intra-baffle channel 88 extends laterally within the respective structure baffle 62 between opposing sides 90 of the respective intra-baffle channel 88. Referring to FIG. 6, each intra-baffle channel 88 projects radially into the engine apparatus 20 and its respective structure baffle 62 (in the radial inward direction) from the structure outer side 56 to a radial inner side 92 of the respective intra-baffle channel 88. The channel side 92 of FIG. 6 is radially aligned with the channel side 78 (see also FIG. 3). A radial span 94 of each intra-baffle channel 88 may thereby be equal to the radial span 84 of each inter-baffle channel 76 (see also FIG. 3). Each intra-baffle channel 88 projects axially into the engine apparatus 20 and its respective structure baffle 62 from the structure outer side 56 to an axial end 96 of the respective intra-baffle channel 88. An inner portion of each intra-baffle channel 88 also extends axially within the respective structure baffle 62 from a first axial end 97 to the second axial end 96. The channel end 96 of FIG. 6 is axially aligned with the channel end 80 (see FIG. 3). Each intra-baffle channel 88 may have a different (e.g., smaller) axial span 98 than the axial span 86 of each inter-baffle channel 76 (see also FIG. 3).

Referring to FIG. 4, each intra-baffle channel 88 is disposed laterally between a respective laterally neighboring pair of the inter-baffle channels 76. Similarly, each inter-baffle channel 76 is disposed laterally between a respective laterally neighboring pair of the intra-baffle channel 88. The intra-baffle channels 88 are arranged circumferentially about the axis 24 and the apparatus shaft 30 (see FIG. 1) in an annular array; e.g., a circular array. The intra-baffle channels 88 are circumferentially interposed with the inter-baffle channels 76.

Referring to FIG. 6, each intra-baffle channel 88 may have a polygonal (e.g., trapezoidal) sectional geometry when viewed, for example, in the axial reference plane. Moreover, each intra-baffle channel 88 radially tapers as the respective intra-baffle channel 88 extends axially within the respective structure baffle 62 in a direction from the structure base 60 towards the axial distal end 70 of the support structure 34. An outer portion of each intra-baffle channel 88 also axially tapers as the respective intra-baffle channel 88 extends radially within the respective structure baffle 62 in the radial outward direction.

Figure 7:
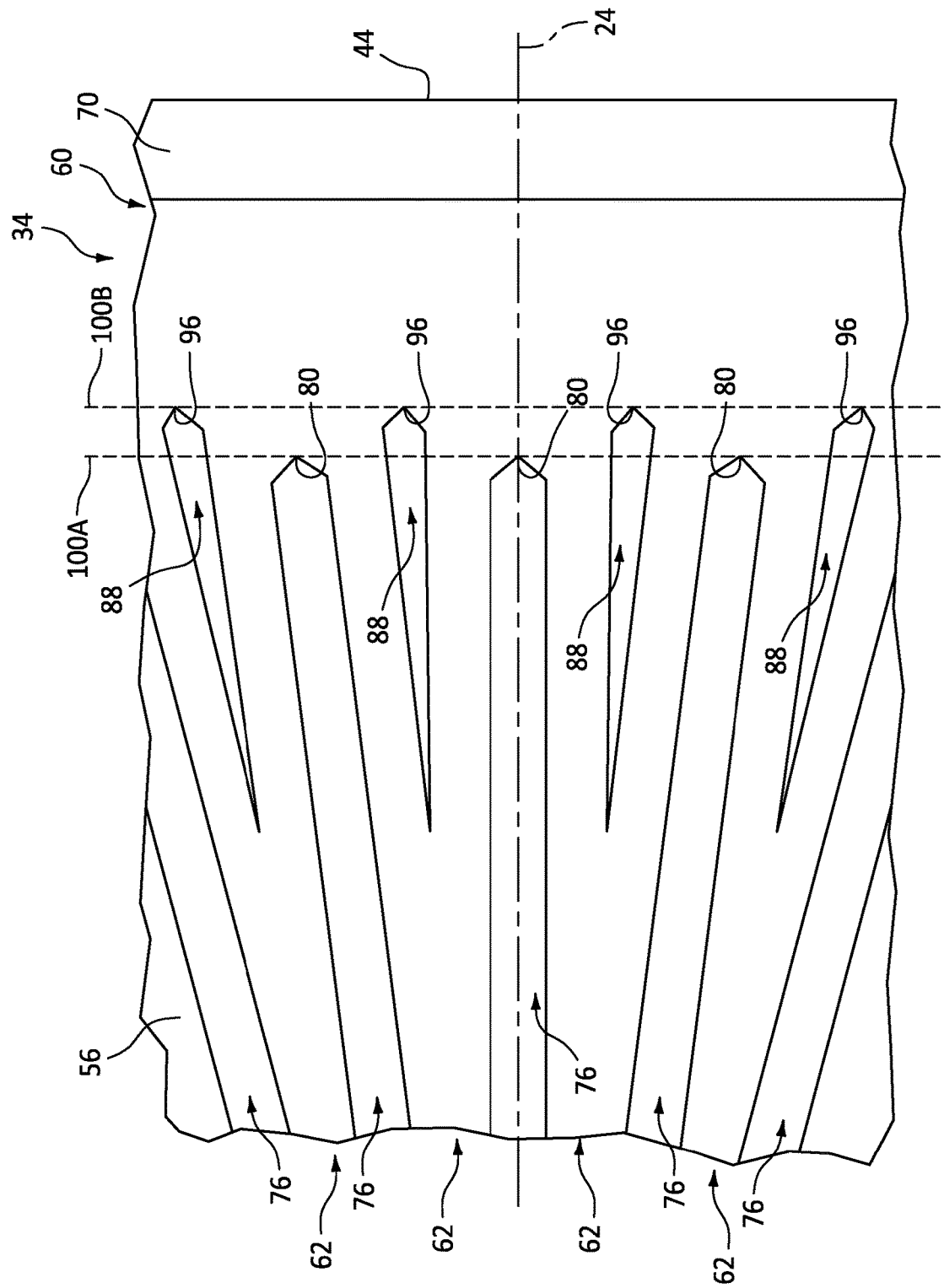
FIG. 7 is a perspective illustration of a section of the support structure with staggered arrangement of channels.
Figure 9:
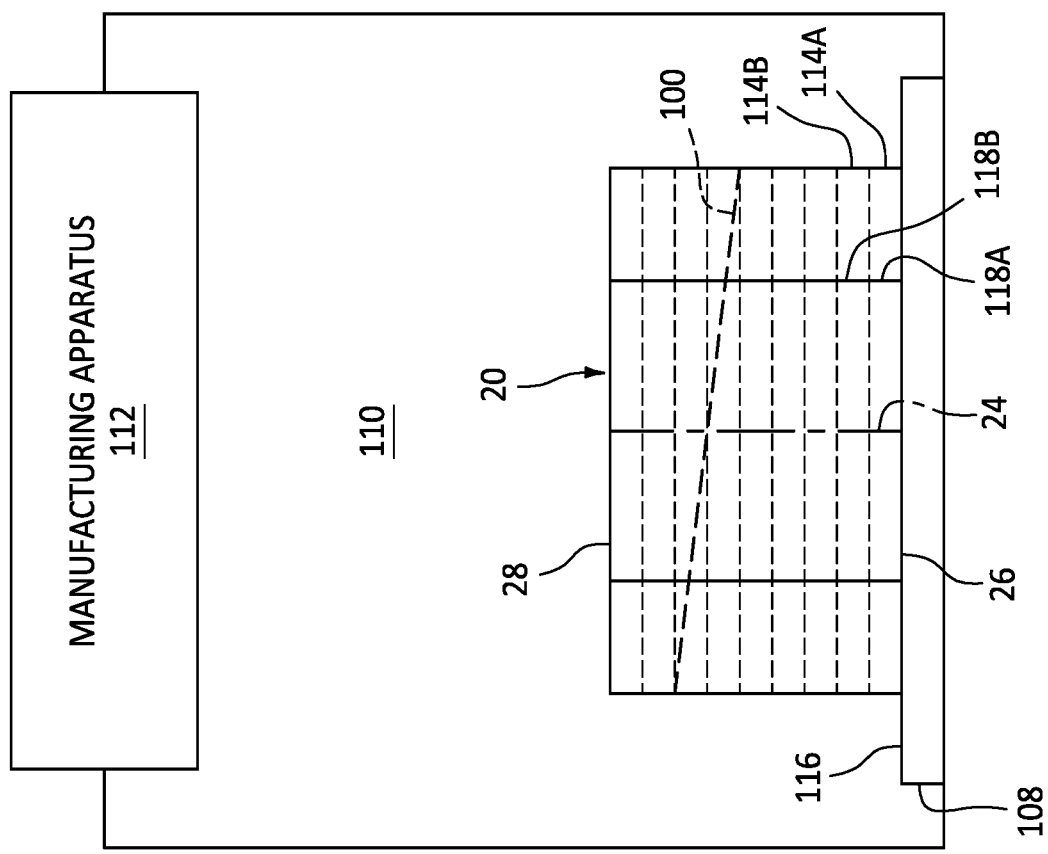
FIG. 9 is a schematic illustration of an additive manufacturing apparatus for forming the turbine engine apparatus.

Referring to FIG. 4, each channel end 80 of some or all of the inter-baffle channels 76 and/or each channel end 96 of some or all of the intra-baffle channels 88 may be aligned with a common channel reference plane 100. For example, referring to FIG. 3, one or more common points (e.g., an outer end point, a mid-point, etc.) along a radial span line 102 of each channel end 80 may lie in the channel reference plane 100. More particularly, at least eighty percent or an entirety of the radial span line 102 may lie along/on the channel reference plane 100. Similarly, referring to FIG. 6, one or more common points (e.g., an outer end point, a mid-point, etc.) along a radial span line 104 of each channel end 96 may lie in the channel reference plane 100. More particularly, at least eighty percent or an entirety of the radial span line 104 may lie along/on the channel reference plane 100. The channel reference plane 100 of FIG. 4 is angularly offset from the axis 24 by an included angle 106; e.g., a (non-zero) acute angle. This included angle 106 may be equal to or greater than eight-five degrees (85°); e.g., eighty-eight degrees (88°) or eighty-nine degrees (89°). With this canted arrangement, the thermal stresses within the engine apparatus 20 may be spread out into different additive manufacturing layers when manufactured (e.g., see channel reference plane in FIG. 9) as described below in further detail. However, it is contemplated the channel reference plane 100 may alternatively be perpendicular to the axis 24 in other embodiments. For example, rather than canting the channel reference plane 100, the channel ends 80 and 96 may be axially offset in different reference planes. For example, referring to FIG. 7, the channel ends 80 are aligned with a first channel reference plane 100A while the channel ends 96 are aligned with a second channel reference plane 100B. The second channel reference plane 100B is axially offset from the first channel reference plane 100A along the axis 24 to similarly spread out thermal stresses during engine apparatus manufacture. Of course, one or both of the channel references planes 100A and/or 100B may also be canted like the channel reference plane 100.

Figure 8:
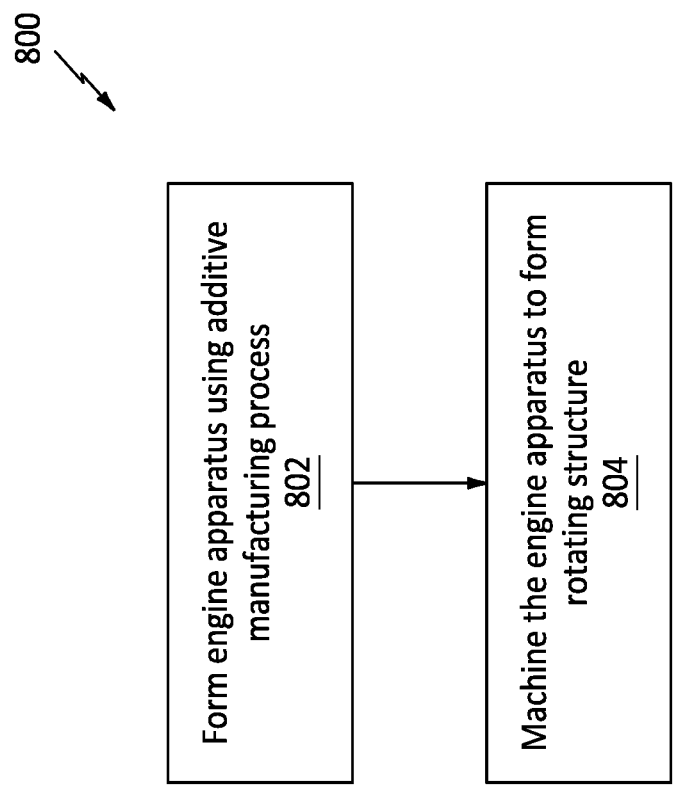
FIG. 8 is a flow diagram of a method of manufacturing.

FIG. 8 is a flow diagram of a method 800 of manufacturing. For ease of description, this manufacturing method 800 is described below with reference to the engine apparatus 20 and the rotating structure 22 described above. The manufacturing method 800 of the present disclosure, however, is not limited to such exemplary arrangements.

In step 802, the engine apparatus 20 is formed using an additive manufacturing process. For example, referring to FIG. 9, the engine apparatus 20 may be built onto/over a build plate 108 within a build chamber 110 of an additive manufacturing apparatus 112. The engine apparatus 20 may be built during the formation step 802 such that the axis 24 is perpendicular to the build plate 108, and the apparatus second end 28 is vertically above (e.g., with respect to gravity) the apparatus first end 26. The engine apparatus 20 is built onto the build plate 108 in a layer-by-layer fashion using the additive manufacturing apparatus 112. Examples of this additive manufacturing process include, but are not limited to, a stereolithography (SLA) process, a direct selective laser sintering (DSLS) process, an electron beam sintering (EBS) process, an electron beam melting (EBM) process, a laser engineered net shaping (LENS) process, a laser net shape manufacturing (LNSM) process, a direct metal deposition (DMD) process, a direct metal laser sintering (DMLS) process or any other type of additive manufacturing process.

During the formation step 802, the additive manufacturing apparatus 112 may deposit a first layer 114A of powder over a support surface 116 of the build plate 108 within the build chamber 110. The additive manufacturing apparatus 112 may thereafter selectively solidify (e.g., sinter, fuse, melt, etc.) a select portion of the powder in the first layer 114A using an energy beam (e.g., a laser beam or an electron beam) to form a first portion 118A (e.g., layer, slice) of the engine apparatus 20. The additive manufacturing apparatus 112 may then deposit a second layer 114B of powder over the selectively sintered first layer of powder within the build chamber 110. The additive manufacturing apparatus 112 may thereafter again selectively solidify a select portion of the powder in the second layer 114B using the energy beam to form a second portion 118B (e.g., layer, slice) of the engine apparatus 20. The solidified second portion 118B is also fused to the underlining solidified first portion 118A by the solidifying of the powder in the second layer. This process may be repeated one or more times until the engine apparatus 20 is (e.g., completely, entirely) formed within the build chamber 110. During the formation step 802, the support structure 34 is built to support the formation of the bladed rotor 32 (see FIG. 1).

The engine apparatus 20 and its various members 30, 32 and 34 may be formed during the formation step 802 as (or otherwise part of) a monolithic body. Herein, the term "monolithic" may describe an object which is formed as a single, unitary body. The engine apparatus 20 and its various members (e.g., 30, 32 and 34), for example, are additively manufactured during the formation step 802 as an integral, unitary body. By contrast, a non-monolithic body may include multiple parts that are discretely formed from one another, where those parts are subsequently mechanically fastened and/or otherwise attached to one another.

In step 804, the engine apparatus 20 is machined to form the rotating structure 22. The apparatus shaft 30, for example, may be machined (e.g., turned, milled, etc.) to form an engine shaft 120 of the rotating structure 22. Some or all of the support structure 34 may also or alternatively be machined away to remove one or more or all of the support structure members 60, 62, 76 and/or 88. Following this machining step 804, the rotating structure 22 may be in its final form and ready for installation within the turbine engine. In other embodiments, however, one or more additional finishing steps may be performed; e.g., heat treating, coating, polishing, etc. In still other embodiments, this machining step 804 may be omitted where, for example, the support structure 34 is retained as part of the final rotating structure design. The support structure 34 of FIG. 1 and its structure baffles 62, for example, may be retained to provide cooling fins for the bladed rotor 32.

Figure 10:
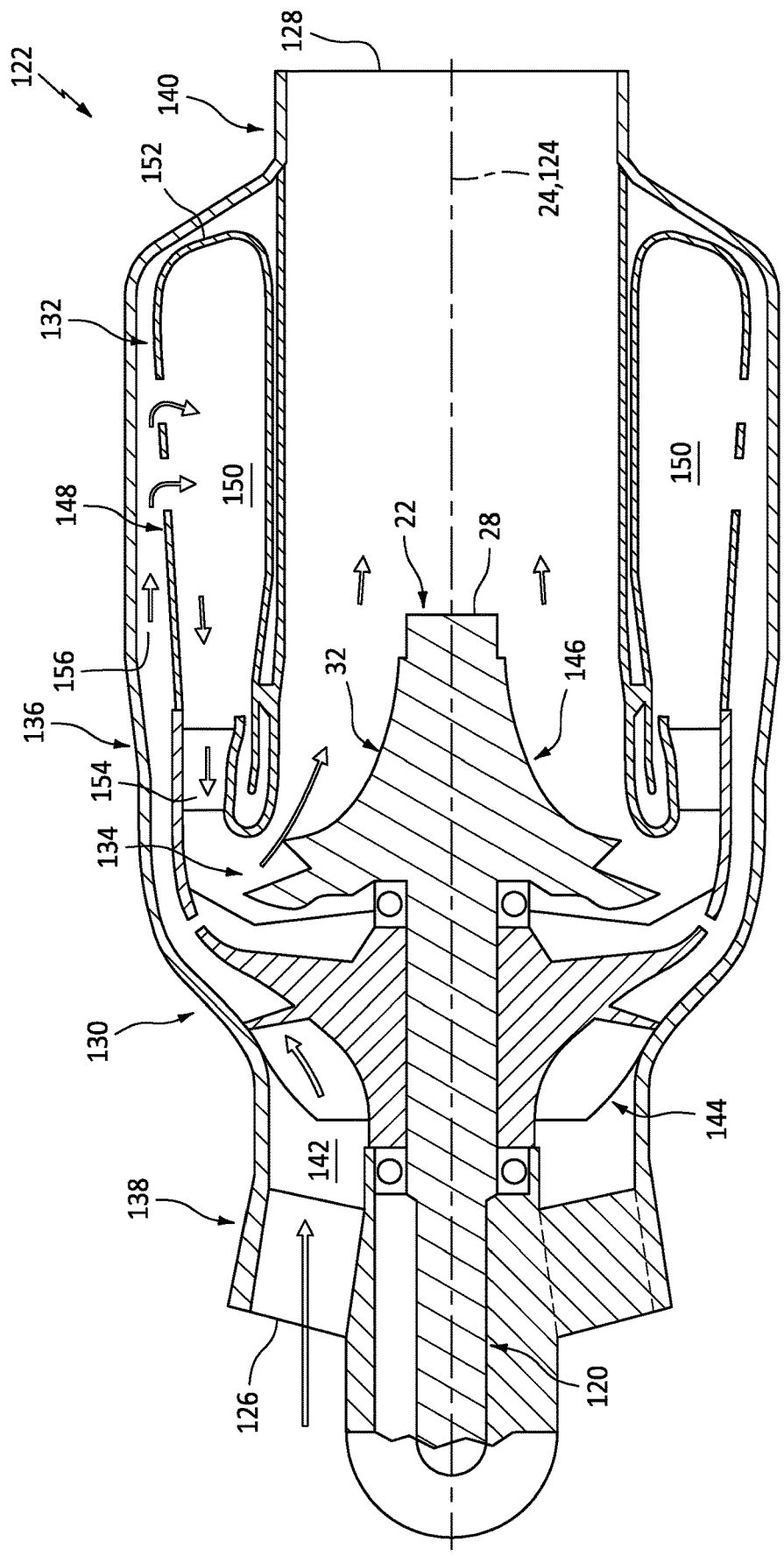
FIG. 10 is a partial side sectional illustration of a gas turbine engine.

FIG. 10 illustrates an example of the turbine engine which may include the rotating structure 22 of FIG. 2 (or the engine apparatus 20 of FIG. 1 where the support structure 34 is retained, for example). This turbine engine is configured as a single spool, radial-flow turbojet gas turbine engine 122. The gas turbine engine 122 of FIG. 10 extends axially along an axial centerline 124 between a forward, upstream airflow inlet 126 and an aft, downstream combustion products exhaust 128. This axial centerline 124 may be parallel with (e.g., coaxial with) the axis 24 of the rotating structure 22 (or the engine apparatus 20). The axial centerline 124 may also or alternatively be a rotational axis for one or more components within the gas turbine engine 122.

The gas turbine engine 122 includes a compressor section 130, a combustor section 132 and a turbine section 134. The gas turbine engine 122 also includes a static engine structure 136. This static engine structure 136 houses the compressor section 130, the combustor section 132 and the turbine section 134. The static engine structure 136 of FIG. 1 also forms an inlet section 138 and an exhaust section 140 for the gas turbine engine 122, where the inlet section 138 forms the engine inlet 126 and the exhaust section 140 forms the engine exhaust 128.

The engine sections 138, 130, 132, 134 and 140 arranged sequentially along a core flowpath 142 that extends through the gas turbine engine 122 from the engine inlet 126 to the engine exhaust 128. Each of the engine sections 130 and 134 includes a respective bladed rotor 144 and 146. Each of these bladed rotors 144 and 146 includes a plurality of rotor blades arranged circumferentially around and connected to at least one respective rotor disk or hub. The rotor blades, for example, may be formed integral with or mechanically fastened, welded, brazed and/or otherwise attached to the respective rotor disk(s) or hub(s). The bladed rotor 32 of FIG. 2 may be configured as the turbine rotor 146, or alternatively as the compressor rotor 144 in other embodiments.

The compressor rotor 144 of FIG. 10 may be configured as a radial flow rotor. The turbine rotor 146 may also or alternatively be configured as a radial flow rotor. The compressor rotor 144 is connected to the turbine rotor 146 through the engine shaft 120. This engine shaft 120 is rotatably supported by the static engine structure 136 through a plurality of bearings; e.g., rolling element bearings, journal bearings, etc.

The combustor section 132 includes an annular combustor 148 with an annular combustion chamber 150. The combustor 148 of FIG. 10 is configured as a reverse flow combustor. Inlets ports/flow tubes into the combustion chamber 150, for example, may be arranged at (e.g., on, adjacent or proximate) and/or towards an aft bulkhead wall 152 of the combustor 148. An outlet 154 from the combustor 148 may be arranged axially aft of an inlet to the turbine section 134. The combustor 148 may also be arranged radially outboard of and/or axially overlap at least a (e.g., aft) portion of the turbine section 134. With this arrangement, the core flowpath 142 of FIG. 10 reverses its directions (e.g., from a forward-to-aft direction to an aft-to-forward direction) a first time as the core flowpath 142 extends from a diffuser plenum 156 surrounding the combustor 148 into the combustion chamber 150. The core flowpath 142 of FIG. 10 then reverses its direction (e.g., from the aft-to-forward direction to the forward-to-aft direction) a second time as the core flowpath 142 extends from the combustion chamber 150 into the turbine section 134.

During operation, air enters the gas turbine engine 122 through the inlet section 138 and its engine inlet 126. The inlet section 138 directs this air from the engine inlet 126 into the core flowpath 142 and the compressor section 130. The engine inlet 126 of FIG. 10 thereby forms a forward, upstream inlet to the core flowpath 142 and the compressor section 130. The air within the core flowpath 142 may be referred to as core air.

The core air is compressed by the compressor rotor 144 and directed through a diffuser and its plenum 156 into the combustion chamber 150. Fuel is injected and mixed with the compressed core air to provide a fuel-air mixture. This fuel-air mixture is ignited within the combustion chamber 150, and combustion products thereof flow through the turbine section 134 and cause the turbine rotor 146 to rotate. This rotation of the turbine rotor 146 drives rotation of the compressor rotor 144 and, thus, compression of the air received from the engine inlet 126. The exhaust section 140 receives the combustion products from the turbine section 134. The exhaust section 140 directs the received combustion products out of the gas turbine engine 122 to provide forward engine thrust.

The gas turbine engine 122 is described above as a single spool, radial-flow turbojet turbine engine for ease of description. The present disclosure, however, is not limited to such an exemplary gas turbine engine. The gas turbine engine, for example, may alternatively be configured as an axial flow gas turbine engine. The gas turbine engine may be configured as a direct drive gas turbine engine. The gas turbine engine may alternatively include a geartrain that connects one or more rotors together such that the rotors rotate at different speeds. The gas turbine engine may be configured with a single spool (e.g., see FIG. 10), two spools, or with more than two spools. The gas turbine engine may be configured as a turbofan engine, a turbojet engine, a turboprop engine, a turboshaft engine, a propfan engine, a pusher fan engine or any other type of turbine engine. In addition, while the gas turbine engine is described above with an exemplary reverser flow annular combustor, the gas turbine engine may also or alternatively include any other type/configuration of annular, tubular (e.g., CAN), axial flow and/or reverser flow combustor. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of manufacturing, comprising:
   forming a body using an additive manufacturing process;
   the body including a shaft, a bladed rotor and a support structure;
   the shaft projecting axially along an axis out from the bladed rotor; and
   the support structure projecting radially out from the shaft and axially to the bladed rotor, the support structure including a plurality of channels, a plurality of baffles defining a support structure outer side, and an annular structure base disposed axially between the plurality of baffles and the bladed rotor, the support structure outer side angularly offset from the axis by a non-zero acute angle such that the support structure outer side has a frustoconical arrangement extending from an outer surface of the shaft to the annular structure base, the plurality of channels arranged circumferentially about the axis, the plurality of baffles arranged circumferentially about the axis and interposed with the plurality of channels, each of the plurality of channels projecting radially into the support structure towards the axis and to a respective channel side, and each of the plurality of channels projecting axially into the support structure towards the bladed rotor and to a respective channel end;
   machining away at least some of the support structure; and
   machining the shaft to form an engine shaft;
   wherein:
   each of the plurality of baffles projects radially out from the shaft and axially towards the bladed rotor;
   each of the plurality of baffles projects radially to the support structure outer side;
   each of the plurality of baffles laterally tapers as each respective baffle extends radially towards the shaft.

2. The method of claim 1, wherein the channel end of each of the plurality of channels is aligned with a reference plane which is angularly offset from the axis by a second acute angle.

3. The method of claim 2, wherein at least eighty percent of a span line of the channel end of each of the plurality of channels lays along the reference plane.

4. The method of claim 2, wherein a common point along a span line of the channel end of each of the plurality of channels is disposed in the reference plane.

5. The method of claim 2, wherein the second acute angle is equal to or greater than eighty-five degrees.

6. The method of claim 1, wherein
   the plurality of channels are a plurality of first channels, and the support structure further includes a plurality of second channels arranged circumferentially about the axis and interposed with the plurality of first channels;
   each of the plurality of second channels projects axially into the support structure towards the bladed rotor and to a respective channel end, and the channel end of each of the plurality of first channels and the channel end of each of the plurality of second channels is aligned with a reference plane; and
   an axial span of each of the plurality of first channels is different than an axial span of each of the plurality of second channels.

7. The method of claim 1, wherein
   the plurality of channels are a plurality of first channels, and the support structure further includes a plurality of second channels arranged circumferentially about the axis and interposed with the plurality of first channels;
   the channel end of each of the plurality of first channels is aligned with a reference plane; and
   each of the plurality of second channels projects axially into the support structure towards the bladed rotor and to a respective channel end, and the channel end of each of the plurality of second channels is axially offset from the reference plane.

8. The method of claim 1, wherein
   the plurality of channels are a plurality of first channels, and the support structure further includes a plurality of second channels arranged circumferentially about the axis and interposed with the plurality of first channels; and
   an axial span of each of the plurality of first channels is different than an axial span of each of the plurality of second channels, and a radial span of each of the plurality of first channels is equal to a radial span of each of the plurality of second channels.

9. The method of claim 1, wherein
   the plurality of channels comprise a first channel; and
   the first channel has a radial span and a uniform lateral width as the first channel extends radially into the support structure along at least ninety percent of the radial span.

10. The method of claim 1, wherein
    the plurality of channels comprise a first channel; and
    the first channel has an axial span and a uniform lateral width as the first channel extends axially into the support structure along at least ninety percent of the axial span.

11. The method of claim 1, wherein
    the plurality of channels comprise a first channel; and
    the first channel has a triangular sectional geometry or a trapezoidal sectional geometry when viewed in a second reference plane parallel with the axis.

12. The method of claim 1, wherein
    the plurality of channels are a plurality of first channels;
    the plurality of baffles comprise a first baffle; and
    a second channel projects radially into the first baffle towards the axis and axially into the first baffle towards the bladed rotor.

13. The method of claim 1, wherein the machining away of at least some of the support structure removes the plurality of channels.

14. A method of manufacturing, comprising:
forming a monolithic body using an additive manufacturing process;
the monolithic body including a shaft, a bladed rotor and a support structure;
the shaft projecting axially along an axis away from the bladed rotor; and
the support structure extending between the shaft and the bladed rotor, the support structure including a plurality of baffles arranged circumferentially about the axis in an array and defining a support structure outer side, and an annular structure base disposed axially between the plurality of baffles and the bladed rotor, each of the plurality of baffles projecting radially out from the shaft to the outer side of the support structure, and each of the plurality of baffles projecting axially along the shaft, away from the bladed rotor, to the outer side of the support structure, such that the support structure outer side has a frustoconical arrangement extending from an outer surface of the shaft to the annular structure base; and
machining away the plurality of baffles following the forming of the monolithic body, and
machining the shaft to form an engine shaft;
wherein
each of the plurality of baffles laterally tapers as each respective baffle extends radially towards the shaft.

15. The method of claim 14, wherein
the support structure further includes a plurality of channels arranged circumferentially about the axis and interposed with the plurality of baffles;
each of the plurality of channels projects axially into the support structure towards the bladed rotor and to a respective channel end; and
the channel end of at least some of the plurality of channels is aligned with a reference plane which is angularly offset from the axis by an acute angle.

16. The method of claim 14, wherein
the support structure further includes a plurality of channels arranged circumferentially about the axis and interposed with the plurality of baffles;
each of the plurality of channels projects axially into the support structure towards the bladed rotor and to a respective channel end; and
the channel end of at least some of the plurality of channels is aligned with a reference plane, and the channel end of at least some others of the plurality of channels is axially offset from the reference plane.

* * * * *